(12) United States Patent
Kawashima

(10) Patent No.: US 10,546,077 B2
(45) Date of Patent: Jan. 28, 2020

(54) INFORMATION PROCESSOR FOR SIMULATING OPERATION OF A TOOL

(71) Applicant: FANUC CORPORATION, Minamitsuru-gun, Yamanashi (JP)

(72) Inventor: Yuusuke Kawashima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/939,884

(22) Filed: Mar. 29, 2018

(65) Prior Publication Data

US 2018/0293340 A1 Oct. 11, 2018

(30) Foreign Application Priority Data

Apr. 6, 2017 (JP) ................. 2017-076178

(51) Int. Cl.
*G06F 17/50* (2006.01)
(52) U.S. Cl.
CPC ................. *G06F 17/5009* (2013.01)
(58) Field of Classification Search
CPC ............. G06F 17/5009; G06F 17/5086; G06F 2217/12
USPC ..................... 703/7; 700/184, 186
See application file for complete search history.

(56) References Cited

U.S. PATENT DOCUMENTS 6,266,572 B1    7/2001  Yamazaki et al.
6,662,073 B1 *  12/2003 Fujishima .......... G05B 19/4069
                                                    700/109
2013/0253694 A1* 9/2013 Chung ............... G05B 19/4069
                                                    700/186
2014/0180467 A1   6/2014  Sato et al.
2015/0355887 A1  12/2015  Song et al.

FOREIGN PATENT DOCUMENTS

| CN | 104570903 A | 4/2015 |
| CN | 105785912 A | 7/2016 |
| GB | 2323950 A | 10/1998 |
| JP | 07160317 A | 6/1995 |
| JP | 10230436 A | 9/1998 |
| JP | 1128640 A | 2/1999 |
| JP | 1133726 A | 2/1999 |
| JP | 2001-092513 A | 4/2001 |
| JP | 2012014601 A | 1/2012 |
| JP | 2014126939 A | 7/2014 |
| JP | 2017041041 A | 2/2017 |
| WO | 9819822 A1 | 5/1998 |
| WO | 2015029218 A1 | 3/2015 |

OTHER PUBLICATIONS

Japanese Decision to Grant a Patent for Japanese Application No. 2017-076178, dated Jan. 8, 2019 with translation, 6 pages.
Chinese Office Action for Chinese Application No. 201810301900.8, dated Aug. 12, 2019, with translation, 13 pages.

* cited by examiner

*Primary Examiner* — Eunhee Kim
(74) *Attorney, Agent, or Firm* — RatnerPrestia

(57) ABSTRACT

An information processor performs simulation processing based on information on a workpiece and a machining program and specifies an air-cut path, which is a tool path in which the tool is not in contact with the workpiece, for each of blocks included in the machining program, based on the result of the simulation processing. Moreover, the apparatus calculates a time required for a movement in the air-cut path for each block and changes the display mode of the block on a screen based on the calculated time.

3 Claims, 4 Drawing Sheets

INFORMATION PROCESSOR FOR SIMULATING OPERATION OF A TOOL

CROSS-REFERENCE TO RELATED APPLICATION

This application is a new U.S. patent application that claims benefit of Japanese Patent Application No. 2017-076178, filed Apr. 6, 2017, the disclosure of this application is being incorporated herein by reference in its entirety for all purposes.

BACKGROUND OF THE INVENTION

Field of the Invention

The present invention relates to an information processor, and more particularly, to an information processor configured to display air-cut distance/time.

Description of the Related Art

Machining simulation is a method for obtaining the result of machining without performing actual machining. In the machining simulation, a machining program is analyzed in the same manner as in actual machining and the positional relationship between a workpiece and a tool is reproduced on a virtual space. In this way, the result of machining of the workpiece and the state of interference of the tool and the workpiece can be reproduced, whereby a problem of the machining program can be detected.

Cutting based on the machining program involves a part generally called an air cut where the workpiece and the tool are not in contact with each other (i.e., where machining is not performed). An air-cut part of a tool path is also used to increase the tool rotation speed to a desired level or stabilize axial feed. However, the air cut should be minimized because it causes extension of the cycle time if it excessive.

For example, Japanese Patent Application Laid-Open No. 2001-092513 discloses a conventional technique related to an air cut, in which a cutting path and an air-cut path in a tool path can be displayed in a distinguishable manner.

An operator specifies those blocks of a machining program which are subject to air cuts by using a conventional technique such as that disclosed in Japanese Patent Application Laid-Open No. 2001-092513 and modifies the machining program so as to reduce air-cut parts. In performing an operation to reduce the air cuts for a machining program including a large number of blocks, however, air-cut paths are scattered in the machining program. Accordingly, there is a problem that those ones of the blocks involving the air cuts which enable the cycle time to be efficiently reduced by modifying their air-cut parts are not immediately obvious.

Moreover, according to the technique disclosed in Japanese Patent Application Laid-Open No. 2001-092513, the air-cut path parts of the tool path can only be discriminated and times required for the air cuts of the individual parts are not indicated. Therefore, those air-cut paths which form bottlenecks against the reduction of the cycle time cannot be specified.

Thus, there is a problem that the cycle time cannot be efficiently reduced even with use of the technique of Japanese Patent Application Laid-Open No. 2001-092513.

SUMMARY OF THE INVENTION

Accordingly, the object of the present invention is to provide an information processor configured so that an operator can efficiently reduce the cycle time based on a reduction in air-cut parts of a machining program.

According to the present invention, the above problems are solved by displaying an air-cut time for an air-cut part of a tool path in association with blocks of a machining program. The information processor of the present invention enables the operator to specify those blocks which form bottlenecks against the reduction of the cycle time by calculating the air-cut time for each of the blocks of the machining program so that the air-cut time can be referred to by selecting the block concerned or displaying the blocks in different display modes depending on the length of the air-cut time.

Moreover, the information processor of the present invention is configured to make the display modes of axes with long moving distances in the individual blocks different from one another, thereby facilitating the operator to specify an axis or axes that cause extension of the air-cut times.

Furthermore, the information processor of the present invention is configured to jump to blocks with long air-cut times for display based on the operator's operation, thereby facilitating the operator to edit those blocks which form bottlenecks against the reduction of the cycle time.

An information processor according to the present invention is configured to simulate a motion of a tool based on a machining program and comprises a design data storage unit configured to store at least information on a workpiece, a simulation unit configured to perform such simulation processing as to reproduce the positional relationship between the tool and the workpiece on a virtual space based on the information on the workpiece and the machining program, an air-cut path specifying unit configured to specify an air-cut path, which is a tool path in which the tool is not in contact with the workpiece, for each of blocks included in the machining program, based on the result of the simulation processing, an air-cut time calculation unit configured to calculate an air-cut time, which is a time required for a movement in the air-cut path specified by the air-cut path specifying unit, for each block included in the machining program, and a machining program display unit configured to change the display mode of each block included in the machining program, based on the air-cut time.

The machining program display unit may display the display mode of one of axes movable by the blocks included in the machining program, which entails the longest air-cut distance, so as to be different from the display modes of the other axes.

The machining program display unit may selectively display one of the blocks included in the machining program, which entails the longest air-cut time, based on an operator's operation.

According to the present invention, specification of a useless air-cut part in a machining program can be facilitated to reduce an operator's labor by measuring an air-cut time and making a display based on the measured air-cut time.

DETAILED DESCRIPTION OF THE PREFERRED EMBODIMENTS

The following is a description of a configuration example of an information processor for implementing the present invention. The configuration of the information processor of the present invention is not limited to the above example and may be any configuration only if it can achieve the object of the present invention.

Figure 1:
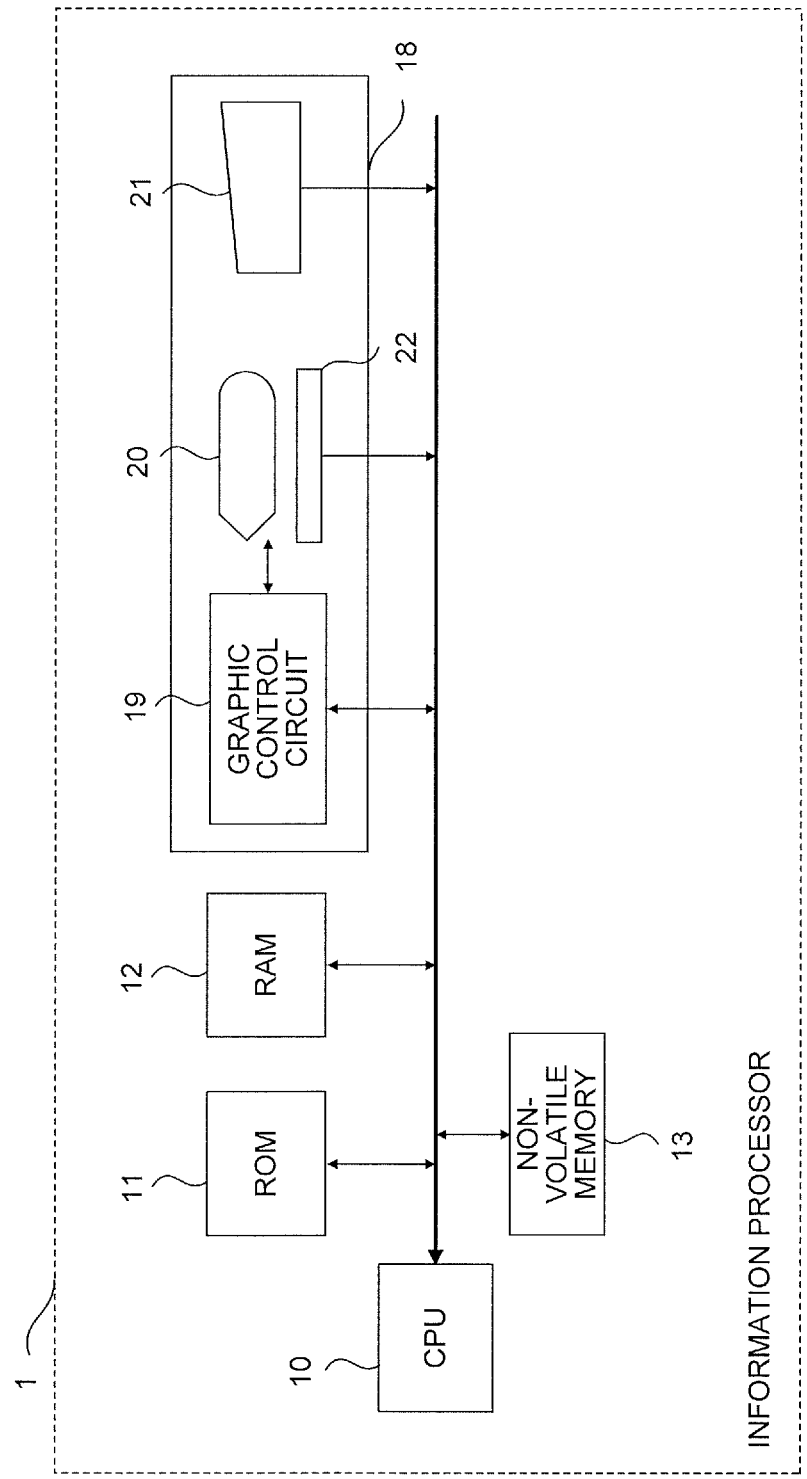
FIG. 1 is a schematic hardware configuration diagram showing a principal part of an information processor according to one embodiment of the present invention.

FIG. 1 is a hardware configuration diagram showing a principal part of an information processor according to one embodiment of the present invention. An information processor 1 can be constructed as a PC, numerical controller, or machining program editing device with a simulation function.

The information processor 1 is mainly composed of a CPU 10. The CPU 10 controls the entire information processor 1 according to a system program stored in a ROM 11. An EPROM or EEPROM is used for the ROM 11.

A DRAM or the like is used for a RAM 12 and is loaded with temporary calculation data, display data, input/output signals and the like. A storage device, such as a CMOS, SRAM or HDD, which is backed up by a battery (not shown), is used for a non-volatile memory 13 and is stored with parameters, machining program and the like to be retained even after the power supply is turned off.

A user interface unit 18 is used to display data and graphics, to input data, and to operate the information processor 1 and comprises a graphic control circuit 19, display device 20, input device 21, and touch panel 22.

The graphic control circuit 19 converts digital signals, such as numerical data and graphic data, into raster signals for display and delivers them to the display device 20, which displays these numerical values and graphics. A liquid-crystal display device is used for the display device 20.

The input device 21 comprises a keyboard, which is provided with numeric keys, symbolic keys, character keys, and function keys, and a pointing device such as a mouse and is used to create and edit machining programs and operate the information processor 1.

The touch panel 22 has the function of detecting touching and dragging operations by an operator. The touch panel 22 is disposed superimposed on the screen of the display device 20. The operator can detect, by means of the touch panel 22, operations on software keys, software buttons, and software switches displayed on the screen of the display device 20. The touch panel 22 is not a constituent element essential to the information processor 1 but may be provided as required. Alternatively, the touch panel 22 and the display device 20 may be combined into a single unit.

Figure 2:
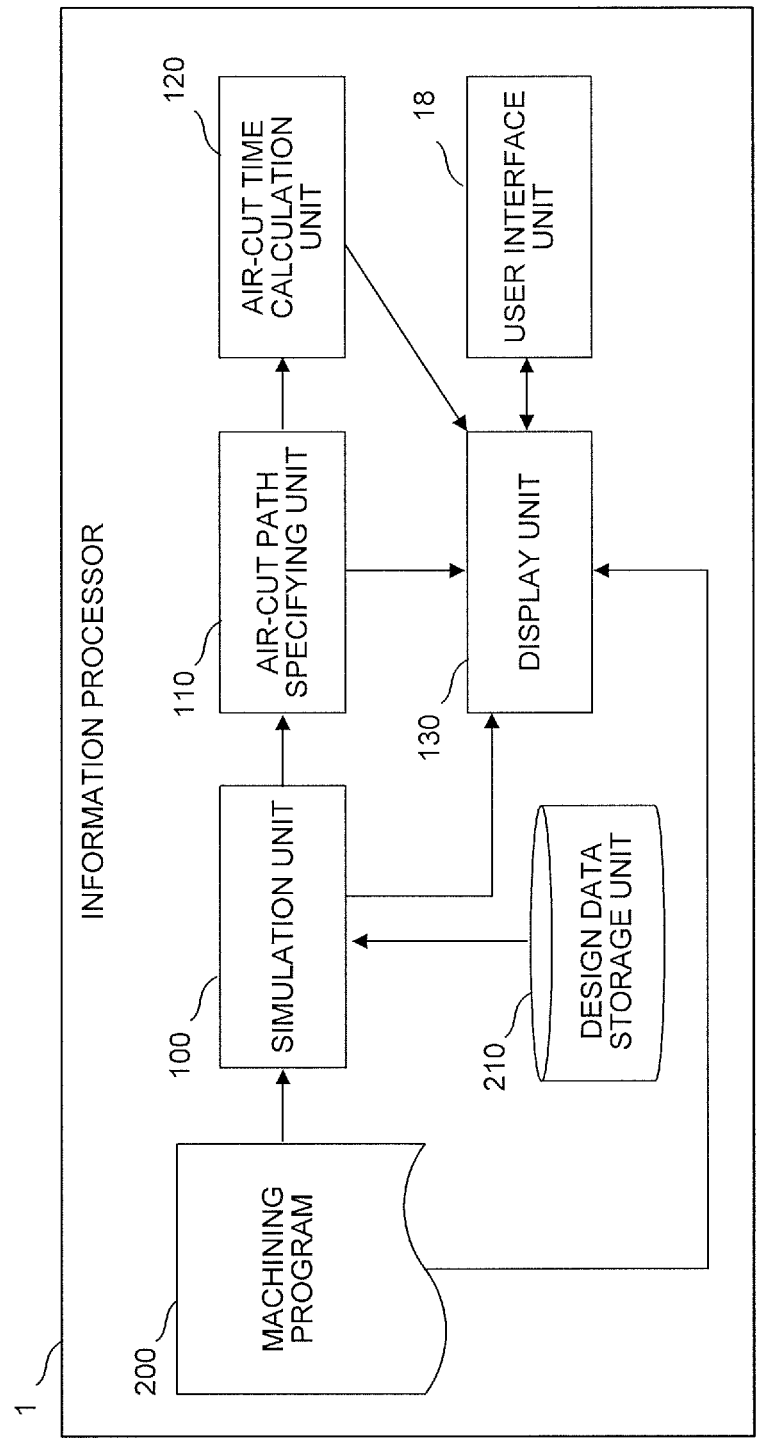
FIG. 2 is a schematic functional block diagram of the information processor according to the embodiment of the present invention.

FIG. 2 is a schematic functional block diagram of the information processor according to the embodiment of the present invention, in which a system program for implementing a cutting speed control function is installed in the information processor 1 shown in FIG. 1.

Functional blocks shown in FIG. 2 are implemented as the CPU 10 of the information processor 1 shown in FIG. 1 executes the system program to control the operations of various parts of the information processor 1. The information processor 1 of the present embodiment comprises a simulation unit 100, air-cut path specifying unit 110, air-cut time calculation unit 120, and display unit 130. Moreover, a design data storage unit 210, which is an area for storing design data output from a CAD/CAM or the like, is provided on the non-volatile memory 13.

The simulation unit 100 performs simulation processing such that it successively reads out command blocks included in the machining program 200 from the non-volatile memory 13, analyzes the read command blocks, and reproduces the positional relationship between a workpiece and a tool on a virtual space. The simulation unit 100 reads out information on the workpiece (e.g., the shape of the workpiece) from the design data stored in the design data storage unit 210 as the simulation is performed and uses it for the simulation processing. Since the simulation processing performed by the simulation unit 100 is well-known in the prior art, a detailed description thereof is omitted herein.

The air-cut path specifying unit 110 specifies an air-cut part of a tool path commanded by the machining program 200, based on the result of the simulation processing performed by the simulation unit 100. The air-cut path specifying unit 110 specifies the air-cut part of the tool path by specifying that part of the tool path commanded by the machining program in which the tool is not moving over the workpiece. The air-cut path specifying unit 110 specifies the air-cut part of the tool path for each of the blocks included in the machining program 200.

The air-cut time calculation unit 120 calculates the time required for the air-cut part of the tool path specified by the air-cut path specifying unit 110. The air-cut time calculation unit 120 calculates an air-cut time for each of the blocks included in the machining program 200, based on the feed rate of a feed command in the block and an air-cut distance in the block specified by the air-cut path specifying unit 110.

The display unit 130 creates the display data displayed on the screen, based on the result of the simulation processing performed by the simulation unit 100, an air-cut path for each block specified by the air-cut path specifying unit 110, and the air-cut time for each block calculated by the air-cut time calculation unit 120, and displays the data on the display device 20 of the user interface unit 18. Moreover, the display unit 130 changes the display on the screen in accordance with the operator's screen display change operation, retrieval operation and the like on the user interface unit 18.

Figure 3:
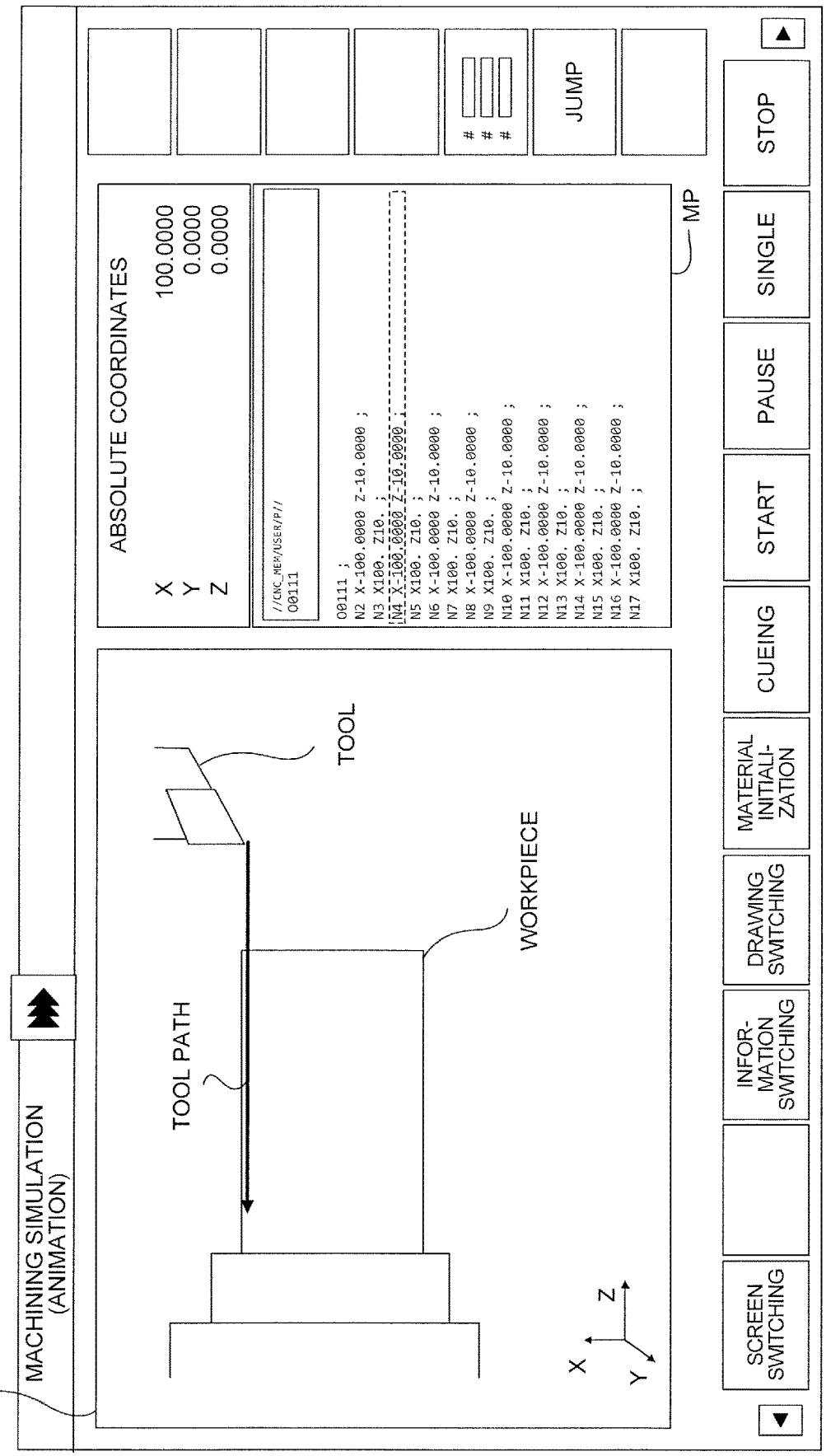
FIG. 3 shows a display example of a machining program based on an air-cut time according to the embodiment of the present invention.

FIG. 3 is a screen display example in which the user interface unit 18 displays a machining simulation screen on the display device 20 based on the display data created by the display unit 130.

The machining simulation screen illustrated in FIG. 3 is provided with a simulation result display column SR in which the result of the simulation processing performed by the simulation unit 100 is displayed and a machining program display column MP in which the machining program 200 is displayed. On the machining simulation screen illustrated in FIG. 3, the movement of the tool and the tool path for the case in which the machining program 200 is performed in order starting from its first block can be successively displayed. The movement of the tool and the tool path can be displayed with the program executed block by block every time a predetermined time elapses or every time a software button ("SINGLE" button in FIG. 3) on the screen is selected.

The machining program 200 as an object of the simulation processing is displayed in the machining program display column MP. The machining program 200 is displayed in the machining program display column MP in such a manner that the currently running program (surrounded by a dotted-line frame in FIG. 3) can be ascertained.

The display mode of each block of the machining program 200 displayed in the machining program display column MP may be changed depending on the length of the air-cut time of the block concerned. For example, some thresholds may be determined in advance such that the blocks can be displayed in white if the air-cut time ranges from 0 to a threshold $T_1$, in yellow if the air-cut time is greater than the threshold $T_1$ and not greater than a threshold $T_2$, and in red if the air-cut time is greater than the threshold $T_2$. Alternatively, for example, the statistics of the air-cut times of the individual blocks may be taken so that the display mode can be changed depending on the ratio of the air-cut time of the block concerned to the total of all air-cut times.

According to the above display example, the operator can ascertain those blocks of the machining program 200 in which an air cut takes time by only watching the machining program 200 displayed in the machining program display column MP.

Figure 4:
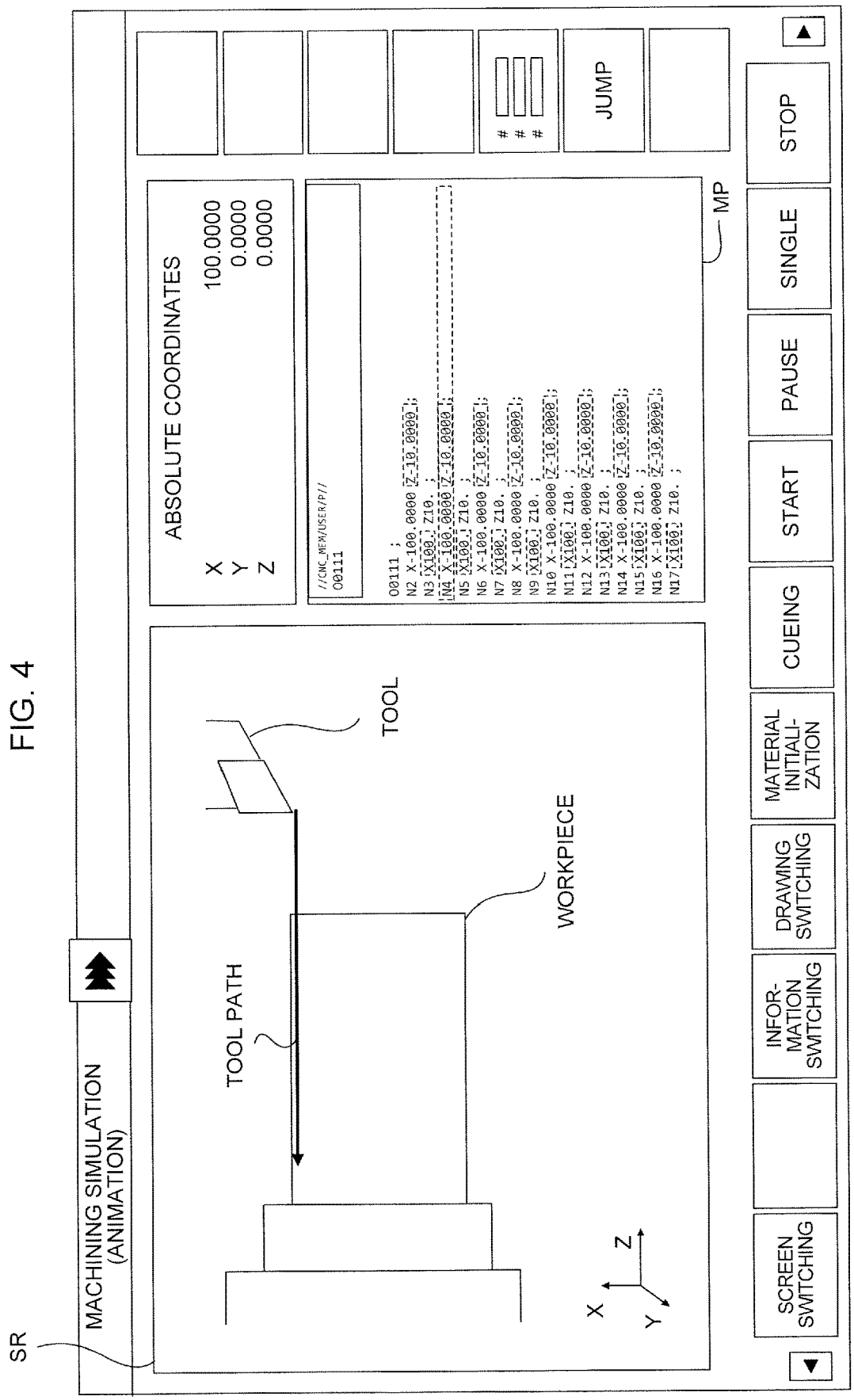
FIG. 4 shows a modification of display of the machining program based on the air-cut time of the present invention.

In another modification of the information processor 1 of the present embodiment, as illustrated in FIG. 4, one of axes movable by the blocks of the machining program 200 displayed in the machining program display column MP, which entails the longest air-cut distance, may be displayed for discrimination. For example, if the air-cut distance for the Z-axis is longer than that for the X-axis in a block where commands are given to move the X- and Z-axes, the command for the Z-axis in the block concerned may be displayed in a highlighted manner or in a color different from that of the command for the X-axis.

According to the above modification, the operator can easily ascertain the axis that entails the longer air-cut distance, in the block of the machining program 200 displayed in the machining program display column MP, so that he/she can easily ascertain the axis of which the moving distance can be reduced to shorten the air-cut time in modifying the block.

In another modification of the information processor 1 of the present embodiment, the operator may be expected to perform a predetermined operation (e.g., operation to select a button "JUMP" displayed on the right-hand side of the simulation screen in the display examples of FIGS. 3 and 4) so that one of the blocks of the machining program 200 displayed in the machining program display column MP, which entails the longest air-cut time, can be selectively displayed. Alternatively, the blocks of the machining program 200 displayed in the machining program display column MP may be selectively displayed in a descending order with respect to the length of the air-cut time every time the operator continuously performs the predetermined operation.

According to the above display example, the operator can ascertain and edit one of the blocks included in the machining program 200, which entails the longest air-cut time, by performing the predetermined operation. Accordingly, the editing operation for the machining program 200 can easily be performed to reduce the cycle time.

While an embodiment of the present invention has been described herein, the invention is not limited to the above-described embodiment and may be suitably modified and embodied in various forms.

The invention claimed is:

1. An information processor configured to simulate a motion of a tool based on a machining program, the information processor comprising:
   a memory device configured to store at least information on a workpiece;
   a processor configured to:
      reproduce the positional relationship between the tool and the workpiece on a virtual space based on the information on the workpiece and the machining program,
      specify an air-cut path, which is a tool path in which the tool is not in contact with the workpiece, for each of blocks included in the machining program, based on the result of the simulation processing,
      calculate an air-cut time, which is a time required for a movement in the air-cut path, for each block included in the machining program, and change a display mode of each block included in the machining program, based on the air-cut time.

2. The information processor according to claim 1, wherein the processor is further configured to set the display mode of one of a plurality of axes movable by the blocks included in the machining program, which entails the longest air-cut distance, so as to be different from display modes of other axes of the plurality of axes.

3. The information processor according to claim 1, wherein the processor is further configured to selectively control the display of one of the blocks included in the machining program, which entails the longest air-cut time, based on an operator's operation.

* * * * *